(12) United States Patent
Karimi et al.

(10) Patent No.: US 11,187,569 B2
(45) Date of Patent: Nov. 30, 2021

(54) FLUID CHARACTERISTIC SENSOR, SENSOR SYSTEM, AND METHOD

(71) Applicant: KING ABDULLAH UNIVERSITY OF SCIENCE AND TECHNOLOGY, Thuwal (SA)

(72) Inventors: Muhammad Akram Karimi, Thuwal (SA); Atif Shamim, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 284 days.

(21) Appl. No.: 16/486,670

(22) PCT Filed: Dec. 7, 2017

(86) PCT No.: PCT/IB2017/057734
§ 371 (c)(1),
(2) Date: Aug. 16, 2019

(87) PCT Pub. No.: WO2018/162968
PCT Pub. Date: Sep. 13, 2018

(65) Prior Publication Data
US 2020/0011725 A1   Jan. 9, 2020

Related U.S. Application Data

(60) Provisional application No. 62/469,213, filed on Mar. 9, 2017.

(51) Int. Cl.
*G01F 23/24* (2006.01)
*G01F 23/26* (2006.01)
(Continued)

(52) U.S. Cl.
CPC .......... *G01F 23/244* (2013.01); *G01F 23/266* (2013.01); *G05D 9/12* (2013.01); *G01F 23/0061* (2013.01); *G01F 23/261* (2013.01)

(58) Field of Classification Search
CPC ..................................... G01F 23/244
See application file for complete search history.

(56) References Cited

U.S. PATENT DOCUMENTS 3,545,482 A    12/1970   Paull
4,912,976 A *   4/1990   Labriola, II .......... G01F 23/263
                                                        141/95

(Continued)

FOREIGN PATENT DOCUMENTS

DE    19736178 C1    1/1999
DE    10057934 A1   12/2003
(Continued)

OTHER PUBLICATIONS

Elhadidy, O., et al., "A CMOS Fractional-N PLL-Based Microwave Chemical Sensor With 1.5% Permittivity Accuracy," IEEE Transactions on Microwave theory and Techniques, Sep. 2013, vol. 61, No. 9, pp. 3402-3416.

(Continued)

*Primary Examiner* — Paul M. West
*Assistant Examiner* — Mark A Shabman
(74) *Attorney, Agent, or Firm* — Patent Portfolio Builders PLLC

(57) ABSTRACT

A sensor includes a planar T-resonator and an oscillator. The planar T-resonator can be a branched T-resonator with at least two symmetrical branches coupled to a stub. The oscillator has an input coupled to the planar T-resonator and an output. The oscillator has a negative resistance within a predetermined frequency range. The oscillator can be configured so that it has an input phase approximately equal to a phase of the planar T-resonator over a majority of the predetermined frequency range.

20 Claims, 9 Drawing Sheets

(51) Int. Cl.
*G05D 9/12* (2006.01)
*G01F 23/00* (2006.01)

(56) References Cited

U.S. PATENT DOCUMENTS

| | | | | |
|---|---|---|---|---|
| 5,416,448 | A * | 5/1995 | Wessendorf | G01N 29/036 |
| | | | | 310/316.01 |
| 5,532,527 | A | 7/1996 | Zatler et al. | |
| 6,407,557 | B1 * | 6/2002 | Coudray | G01F 23/24 |
| | | | | 324/658 |
| 6,606,006 | B1 * | 8/2003 | Alexandersson | H03B 5/02 |
| | | | | 331/108 C |
| 2003/0159504 | A1 * | 8/2003 | Barguirdjian | B32B 17/10293 |
| | | | | 73/170.17 |
| 2013/0277351 | A1 * | 10/2013 | Lamesch | B60R 21/015 |
| | | | | 219/202 |
| 2017/0059492 | A1 * | 3/2017 | Karimi | G01N 33/2823 |

FOREIGN PATENT DOCUMENTS

| | | |
|---|---|---|
| EP | 0610050 A1 | 8/1994 |
| WO | 2012149521 A2 | 11/2012 |

OTHER PUBLICATIONS

International Search Report in corresponding/related International Application No. PCT/IB2017/057734, dated Apr. 10, 2018.

Karimi, M.A., et al., "Low Cost and Pipe Conformable Microwave-Based Water-Cut Sensor," IEEE Sensors Journal, Nov. 1, 2016, vol. 16, No. 21, pp. 7636-7645.

Non-Invasive Fluid Monitoring, Level Detection, Clamp-on Sensor for Level Detection at Drip Chambers, downloaded from the internet Aug. 16, 2019, http://www.sonotec.eu/products/non-invasive-fluid-monitoring/level-detection-at-drip-chambers/sonocheck-ald/.

Written Opinion of the International Searching Authority in corresponding/related International Application No. PCT/IB2017/057734, dated Apr. 10, 2018.

Pepperl+Fuchs, "Guided Level Radar," [Online], Available: http://files.pepperl-fuchs.com/selector_files/navi/productInfo/doct/tdoctb028_usa.pdf, Apr. 2009, Pepperl+Fuchs, Inc.

Sekar, V., et al., "A Self-Sustained Microwave System for Dielectric-Constant Measurement of Lossy Organic Liquids," IEEE Transactions on Microwave Theory and Techniques, May 2012, vol. 60 No. 5, pp. 1444-1455.

Zarifi, M.H., et al., "Microwave Ring Resonator-Based Non-Contact Interface Sensor for Oil Sands Applications," Sensors and Actuators B: Chemical, Oct. 25, 2015, vol. 224, pp. 632-639.

* cited by examiner

700

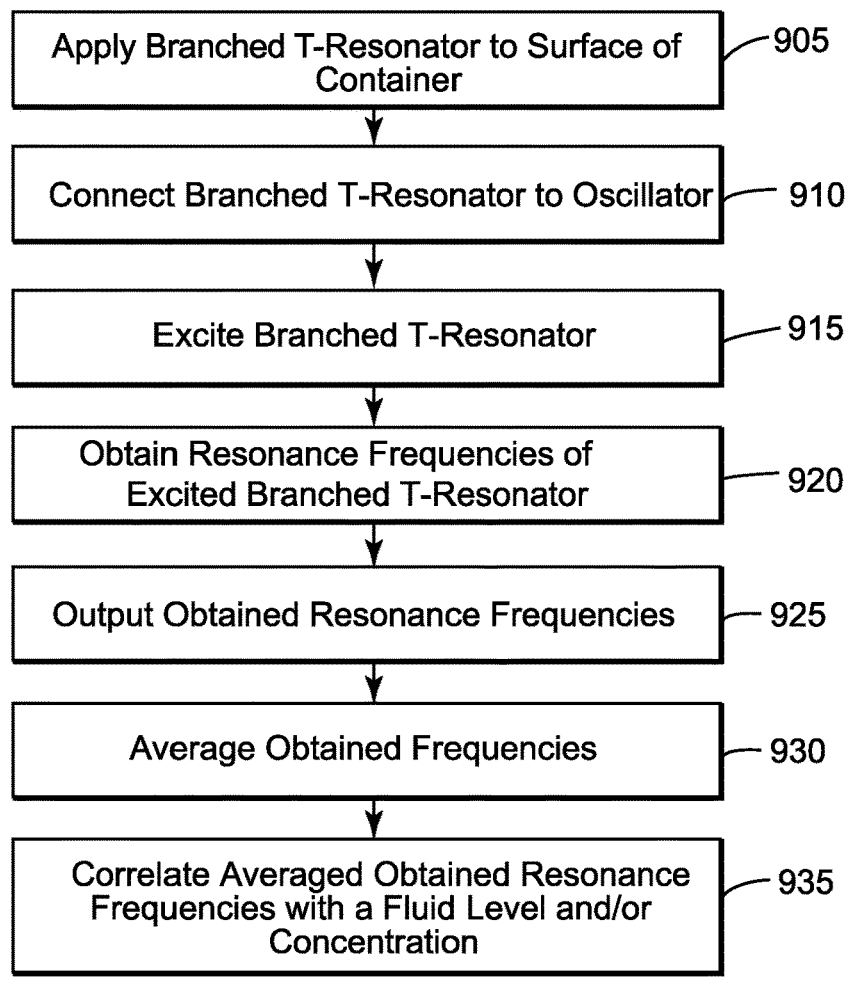
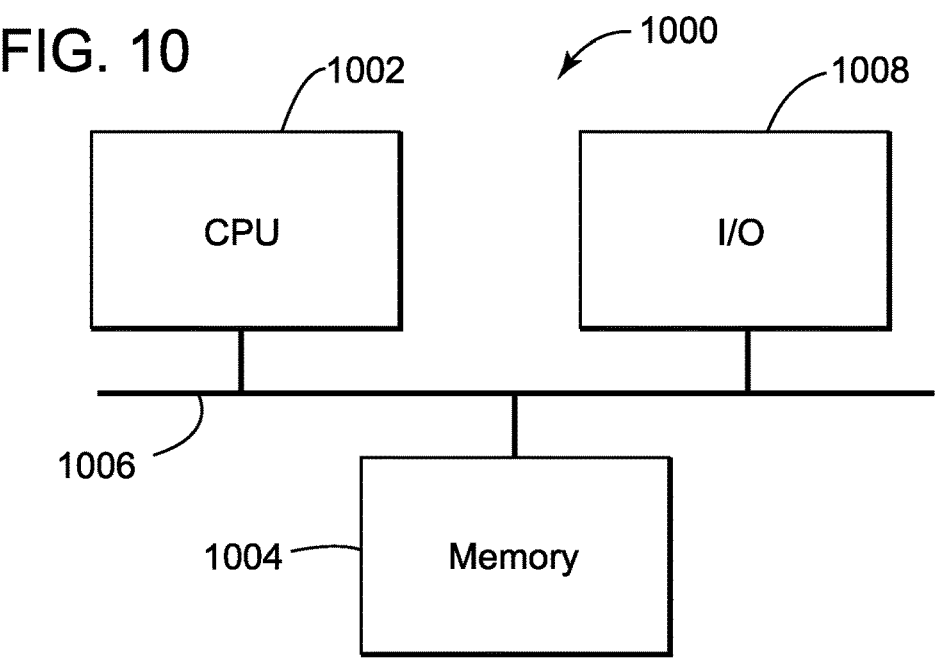

FLUID CHARACTERISTIC SENSOR, SENSOR SYSTEM, AND METHOD

CROSS-REFERENCE TO RELATED APPLICATIONS

This application is a U.S. National Stage of International Application No. PCT/IB2017/057734, filed Dec. 7, 2017, and claims priority from U.S. Patent Application No. 62/469,213, filed on Mar. 9, 2017, entitled "LOW COST AND NON-INTRUSIVE MICROWAVE BASED LEVEL SENSOR DIRECTLY PRINTED ON TUBING", the disclosures of which are incorporated herein by reference in their entirety.

BACKGROUND

Technical Field

Embodiments of the subject matter disclosed herein generally relate to a sensor, sensor system, methods of producing the sensor and sensor system, and methods of using the sensor and sensor system and, more particularly, to mechanisms and techniques for detecting characteristics of fluid in a container.

Discussion of the Background

Detecting characteristics of fluids, such as fluid level within a container or fluid concentration, is useful in a number of different fields, including the medical industry, chemical industry, and water industry. Fluid level sensor systems are employed in a variety of applications, such as detecting the interface level between oil and water in oil production refining processes. One conventional level sensor system employs the principle of Time Domain Reflectometry (TDR) using a probe immersed in a large tank of fluid. The interface level between fluids is detected using microwaves. This level sensor system is intrusive because the probe must be immersed in the fluid, and thus is not suitable for a variety of applications, such as those in which the fluids should be protected from contaminants.

Another conventional fluid sensor system uses a Split Ring Resonator (SRR) as the sensor, which is applied to a container surface and is non-intrusive. Conventional sensors using an SRR sensing element have very limited percentage of tuning, such as in the range of 6%-8%, for different fluids having different dielectric properties. This tuning range limits the application of such sensors because it is insensitive to small fluctuations in fluid levels.

Conventional sensor systems also typically require the container to be relatively perpendicular to the ground to accurately detect certain fluid characteristics, such as fluid level. Any deviation in the tilt of the container from this orientation produces inaccurate sensor readings. Although sensor systems in laboratory environments are easily controlled so that the container is properly oriented with respect to the ground, in many practical applications deviations from the perpendicular orientation are likely to occur.

Accordingly, there is a need for a non-intrusive fluid level sensor that provides a larger percentage of tuning compared to conventional sensors to allow detection of small fluctuations in fluid levels. Further, there is also a need for a sensor that can detect fluid characteristics even when the container has an orientation deviating from perpendicular to the ground.

SUMMARY

According to an exemplary embodiment, there is a sensor system, which includes a planar T-resonator and an oscillator. The planar T-resonator includes a conductor having a feedline coupled to a stub and a ground plane. The oscillator has an input coupled to the planar T-resonator and an output. The oscillator has a negative resistance within a predetermined frequency range and an input phase of the oscillator is approximately equal to a phase of the planar T-resonator over a majority of the predetermined frequency range.

According to another exemplary embodiment, there is a sensor system, which includes a planar, branched T-resonator and an oscillator. The planar, branched T-resonator includes a conductor having a feedline coupled to a stub, at least two symmetrical branches coupled to the stub, and a ground plane. The oscillator has an input coupled to the planar, branched T-resonator and an output, wherein the oscillator has a negative resistance within a predetermined frequency range.

According to yet another embodiment, there is a method for determining a characteristic of a fluid in a container. The method involves exciting a planar, branched T-resonator that includes a feedline coupled to a stub, at least two symmetrical branches coupled to the stub, and a ground plane. The planar, branched T-resonator is connected to an oscillator having a negative resistance within a predetermined frequency range. The planar, branched T-resonator is applied to a surface of the container. The method also involves obtaining a resonance frequency of the excited planar, branched T-resonator and determining the characteristic of the fluid based on the obtained resonance frequency.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 9 illustrates a flowchart of a method for determining a fluid characteristics using a branched T-resonator sensor system according to an embodiment; and FIG. 10 illustrates a schematic diagram of a computing device.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a sensor and sensor system for determining the characteristic of a fluid.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment a sensor system includes a planar T-resonator and an oscillator having a negative resistance within a predetermined frequency range coupled to a planar T-resonator. The planar T-resonator can be a branched T-resonator with at least two symmetrical branches coupled to a stub. The oscillator can have an input phase approximately equal to a phase of the planar T-resonator over a majority of the predetermined frequency range. The planar T-resonator is printed on a flexible substrate so that it can be applied to an inner or outer surface of a container or can be printed directly on the surface of the container. The resonance frequency of the planar T-resonator depends upon characteristics of the fluid in the container (e.g., the level and/or the concentration), and accordingly the characteristics of the fluid in the container can be determined by correlating a resonance frequency of the sensor with a characteristic (e.g., a fluid level and/or fluid concentration) of the fluid.

Figure 1:
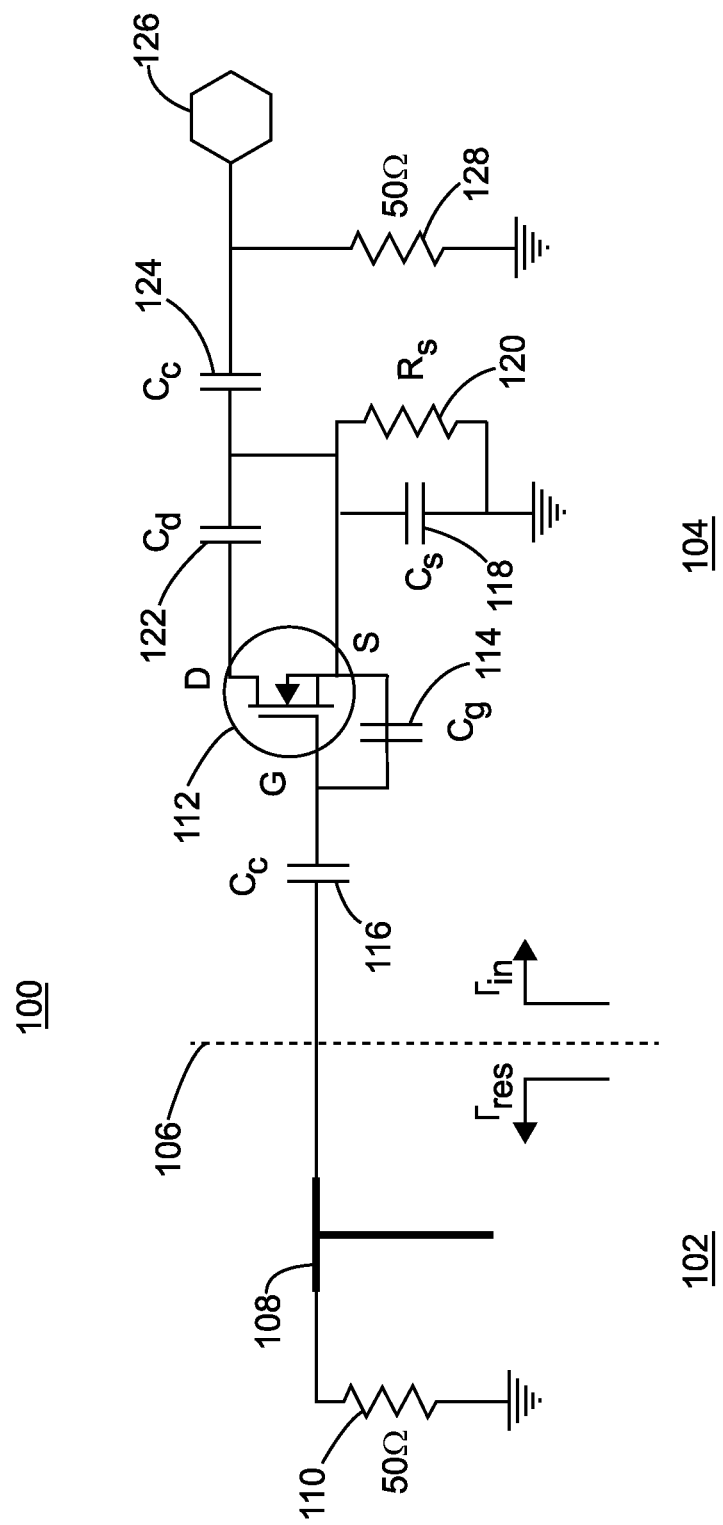
FIG. 1 is a schematic diagram of a sensor system for detecting fluid characteristics according to an embodiment.

FIG. 1 schematically illustrates a sensor system 100 for detecting fluid characteristics, such as fluid levels and/or concentrations according to an embodiment. The sensor system 100 includes a resonating portion 102 and an oscillator 104, the division between the two being illustrated by dotted plane 106. The resonating portion 102 includes a planar T-resonator 108 with a first port terminated by a load 110 (e.g., 50Ω) and a second port coupled to the input of the oscillator 104. The resonating portion 102 can be fabricated using screen printing and a reusable three-dimensional printed mask, and can be printed directly on a container or can be printed on a substrate that can be applied to a surface of the container (not shown). The oscillator 104 can be built on a FR4 substrate using discrete components.

Figure 2B:
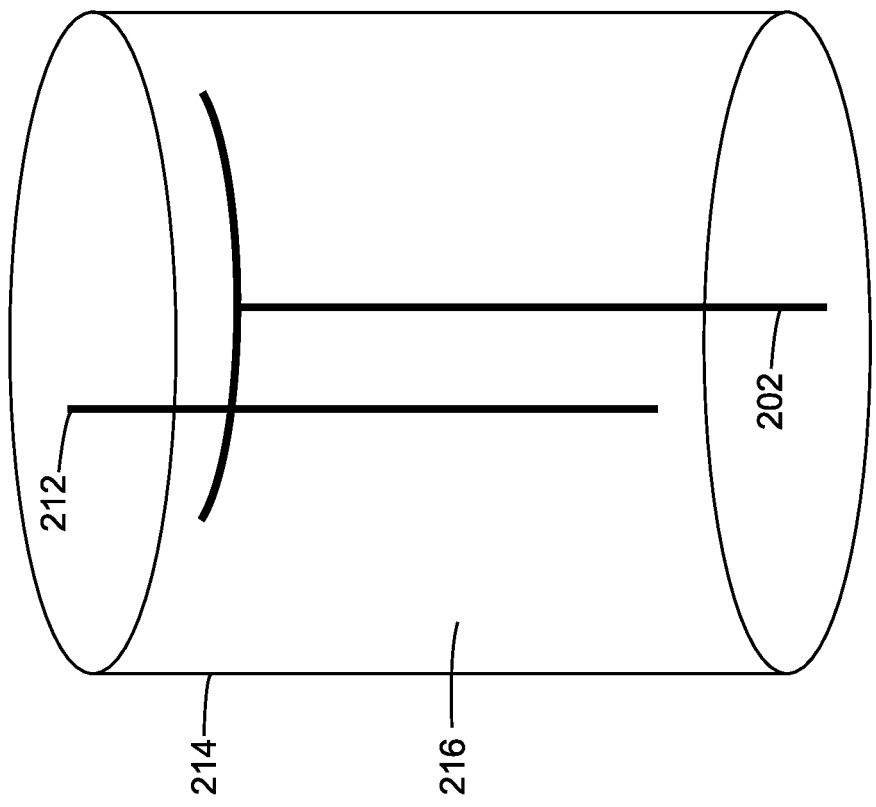
FIGS. 2A and 2B are schematic diagrams of a T-resonator used as part of a fluid sensor according to an embodiment.
Figure 2A:
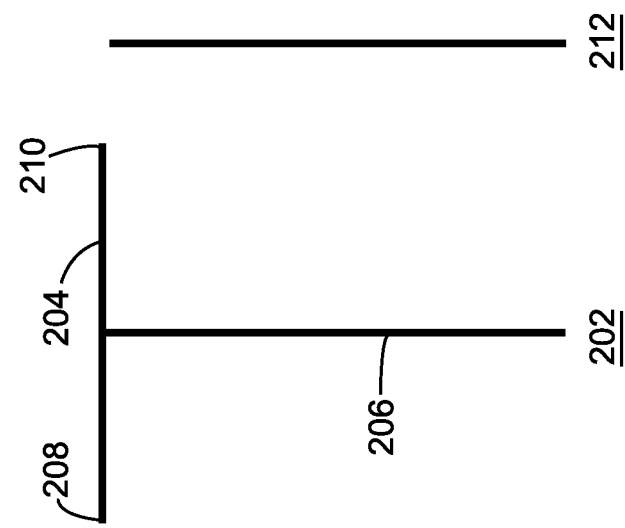

FIGS. 2A and 2B illustrate schematic diagrams of the T-resonator used as part of a fluid sensor system according to an embodiment. The T-resonator includes a conductor 202 and a ground plane 212. The ground plane 212 has substantially parallel sides in a longitudinal direction of the ground plane 212. As used herein substantially parallel means the sides are parallel or within 5° of parallel and includes the longitudinal ends being non-perpendicular. Thus, a T-resonator with ground plane having substantially parallel sides is different from a ring resonator with a ground plane including a ring extending around the container and underneath the feedline of a T-shaped conductor.

The conductor 202 includes a feedline 204 coupled to a stub 206. The feedline includes a first port 208 terminated by the 50Ω load 110 (not illustrated in these figures) and a second port 210 coupled to the input of the oscillator 104 (also not illustrated in these figures). As illustrated in FIG. 2B, the conductor 202 is arranged on the inner or outer surface of one side of a container 214 and the ground plane 212 is arranged on the inner or outer surface of the container 214 opposite of the conductor 202. A fluid is arranged inside the container 216 between the conductor 202 and ground plane 212 and the guided wavelength $\lambda_g$ of the fields existing between the conductor 202 and ground plane 212 determines the resonant frequency of the T-resonator. The dielectric properties of the fluid inside of the container 216 between the conductor 202 and ground plane 212 affect the resonant frequency of the T-resonator, and thus characteristics of the fluid, such as fluid level or concentration, can be determined based on the resonant frequency of the T-resonator. Fluid level includes the absolute level of one or more fluids in a container or the interface level between two fluids in a container. Although FIG. 2 illustrates a cylindrical container 214, the container 214 can have any shape so long as the conductor of the T-resonator and the ground plane can be placed on opposite or different sides of the container. Further, the term container should be understood as broadly encompassing an object that can hold fluid, including pipes, bowls, bags, etc.

Returning to FIG. 1, the oscillator 104 includes a transistor 112, which in the illustrated embodiment is a p-type High-Electron-Mobility Transistor (pHEMT). One such transistor is an ARF53189 by Avago Technologies. A first capacitor $C_g$ 114 is coupled between the source S and gate G of the transistor 112. A second capacitor $C_c$ 116 is coupled between the input of the oscillator 104 and the gate G of the transistor 112 at a common node with the first capacitor $C_g$ 114. An RC circuit, comprising a third capacitor $C_s$ 118 coupled in parallel with a first resistor $R_s$ 120, is coupled to the source S of the transistor 112 at a common node with the first capacitor $C_g$ 114.

A fourth capacitor $C_d$ 122 is coupled to the drain D of the transistor 112 and is also coupled to a common node with the RC circuit and a fifth capacitor $C_c$ 124. The fifth capacitor $C_c$ 124 is also coupled to a common node with an output 126 of the oscillator 104 and a terminated 50Ω load 128. The output 126 can be a display and/or wired or wireless communication interface for providing signals corresponding to the resonance frequency of the T-resonator 108. The wireless communication interface can communicate using 802.11 wireless local area network (WLAN) technology and/or Bluetooth technology.

The T-resonator 108 acts as a frequency selective element that reflects maximum power at its resonant frequency but the reflected power is less than 0 dB due to conductor and dielectric losses of the resonator. To compensate for these losses the oscillator 104 is configured to have negative resistance within a range of frequencies so that the input reflection coefficient $\Gamma_1$ is sufficiently high to compensate for resonator reflection coefficient $\Gamma_{res}$ at the resonant frequency. Those skilled in the art will recognize negative resistance means that within the range of frequencies the oscillator does not produce an Ohmic response and instead within the range of frequencies the current falls as the voltage is increased. Further, the phases of $\Gamma_{in}$ and $\Gamma_{res}$ must also add up to 0° at the dotted plane 106 to achieve reconstructive interference. Thus, the magnitude and phase conditions can be summarized as follows:

$$|\Gamma_{in}|+|\Gamma_{res}|>0 \text{ db} \quad (1)$$

$$\angle\Gamma_{in}+\angle\Gamma_{res}=0° \quad (2)$$

Figure 3:
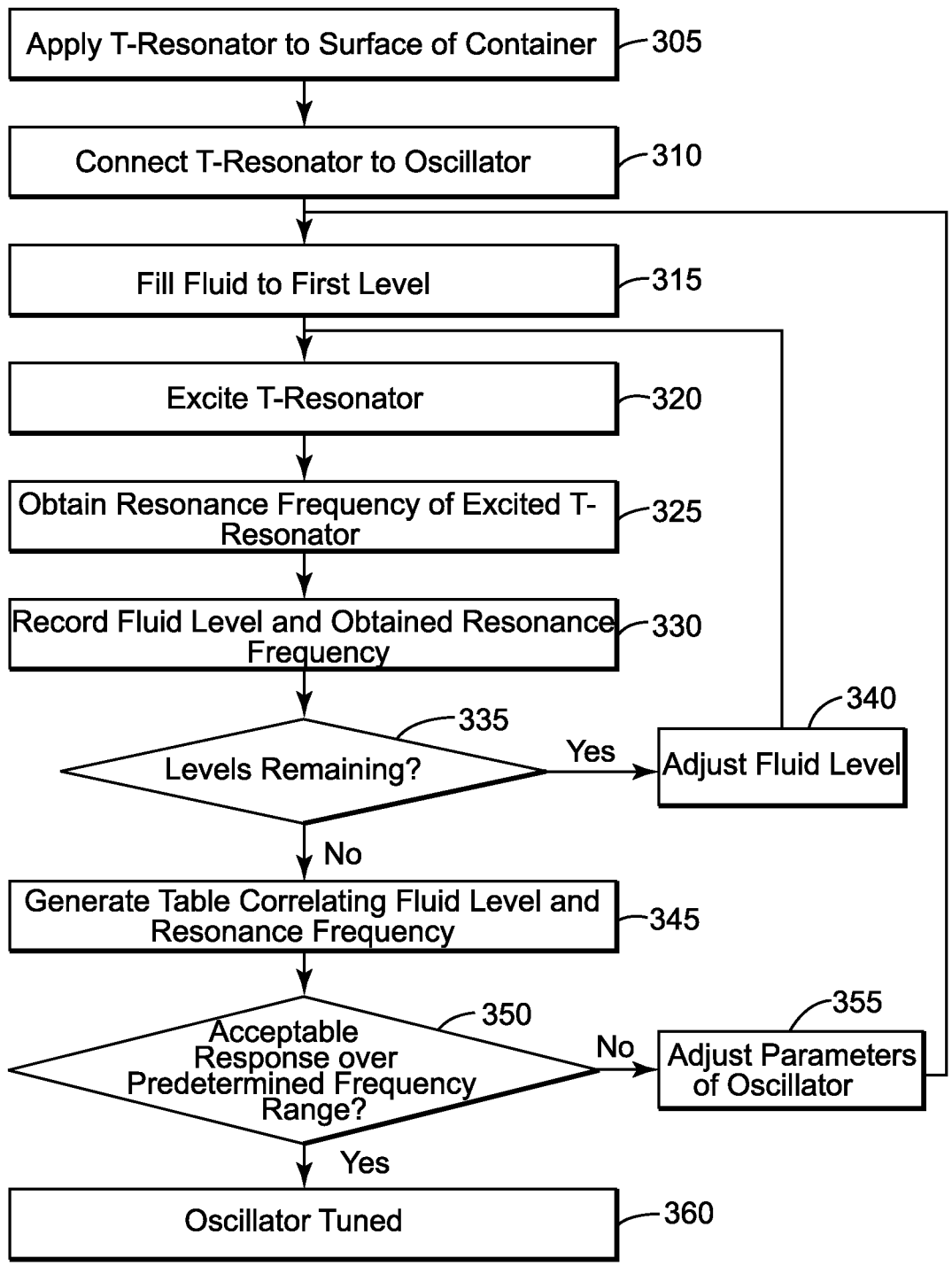
FIG. 3 illustrates a flowchart of a method for calibrating a fluid sensor system according to an embodiment.

The magnitude and phase of $\Gamma_{in}$ can be estimated using the method illustrated in the flowchart of FIG. 3. The T-resonator 108 is attached to an inner or outer surface of a container 214 having the same dimensions as will be used when the sensor system 100 is used for fluid sensing (step 305), and then the T-resonator 108 is connected to the oscillator 104 (step 310). Application of the T-resonator 108 to a surface of the container 214 in this method and the methods that follow can involve screen printing the T-resonator directly on the container or applying the T-resonator that is printed on a flexible substrate. The resonant frequency is then determined for a number of filling levels so that the magnitude and phase required of $\Gamma_{in}$ to meet the oscillation conditions in equations (1) and (2) can be determined. Specifically, the fluid is filled to a first level (step 315) and the T-resonator 108 is excited (step 320) to obtain a resonance frequency of the excited T-resonator (step 325), which is then recorded along with the fluid level (step 330). If there are remaining fluid levels ("Yes" path out of decision step 335), then the fluid level is adjusted (step 340) and the resonance frequency of the T-resonator is obtained for the adjusted fluid level (steps 320-330).

When there are no fluid levels remaining ("No" path out of decision step 335), a table is generated correlating fluid level and resonance frequency (step 345). The correlation table can take any form and can be a database table, a look-up table, and/or the like. It is then determined whether there is an acceptable response over the predetermined frequency range (step 350). If there is not an acceptable response over the predetermined frequency range ("No" path out of decision step 350), then parameters of the oscillator are adjusted (step 355) and the method is repeated using the adjusted parameters. If the response is acceptable over the predetermined frequency range ("Yes" path out of decision step 350), then the oscillator is tuned (step 360).

An example of the method of FIG. 3 will now be described in connection with an oscillator in which the first capacitor $C_g$ 114 has a value of 24 pF, the fourth capacitor has a value of 180 pF, and the first resistor $R_s$ 120 has a value of 5.5Ω. A container in the form of a tube with the T-resonator applied to the tube's inner or outer surface is initially filled with oil and water having an interface level of 77 mm between them and the insertion loss of the resonator $\Gamma_{res}$ showed that a magnitude >3-4 dB and phase of −140° is required from $\Gamma_{in}$ to meet the oscillation conditions of equations (1) and (2). Performing these measurements for a number of different oil/water interface levels produced magnitudes in the range of −3 to −4 dB, while the phase stayed between −140° and −150°. In this case, the resonant frequency of the sensor system ranges between 90 MHz and 190 MHz in the presence of different oil/water interface levels. Over this frequency range the magnitude was greater than 2-3 dB but the phase approaches −60° at the low end of the frequency range (i.e., 90 MHz). Because the phase should be closer to −140°, the phase of the oscillator 104 was flattened without compromising gain. This was achieved by increasing the value of $C_d$ from 180 pF to 220 pF and $C_g$ from 24 pF to 33 pF to obtain more negative phase. These changes shifted the phase response towards the lower frequency, which achieved a flatter phase response within the frequency range of 90 MHz-190 MHz. These changes introduce a slight loss in the negative resistance, which were compensated for by decreasing the value of $R_s$ from 5.5Ω to 4.5Ω.

With these changes to the parameters of the oscillator the phase gap was reduced from between −60° and −170° to between −115° and −170°, which is much closer to −140° in the desired frequency range. These changes also flattened the phase response of the oscillator 104 close to between −140° and −150° over a broad bandwidth of 102 MHz-172 MHz, which is 69% of the desired frequency range. Because the phase of the resonator ∠$\Gamma_{res}$ is mostly constant, which in this example is 140°, this tuning results in the input phase of the oscillator ∠$\Gamma_{in}$ being approximately equal to the phase of the resonator over a majority (69% in this example) of the desired frequency range, i.e., the phase of the resonator ∠$\Gamma_{res}$ is within 10% (approximately 7% in this example) of the input phase of the oscillator ∠$\Gamma_{in}$. When driving the transistor 112 with a $V_{ds}$ of 4.0V and $V_{gs}$ of 1.0V the measured frequency shift between different fluid levels in a container was in the range of 112 MHz to 168 MHz, which results in a 50% tuning range, which is significantly larger than the 6%-8% tuning range of conventional split ring resonators. The output power of the sensor system was between −6 dBm and −3.5 dBm and the output voltage is between 250 mV and 400 mV. The sensor system provides relatively high sensitivity at low fluid levels compared to high levels because the fractional change in the dielectric constant is higher at low interface levels. Operating the sensor system below 200 MHz is particularly advantageous because it uses less power than when it is operated above 200 MHz and frequencies below 200 MHz can be measured using a relatively inexpensive microcontroller, like a PIC16F628, and a comparator, such as a TLV 3501 from Texas Instruments. Additionally, the sensor system does not require complex phase-locked-loop (PLL) based frequency measurement systems that operate in the gigahertz range.

Figure 4:
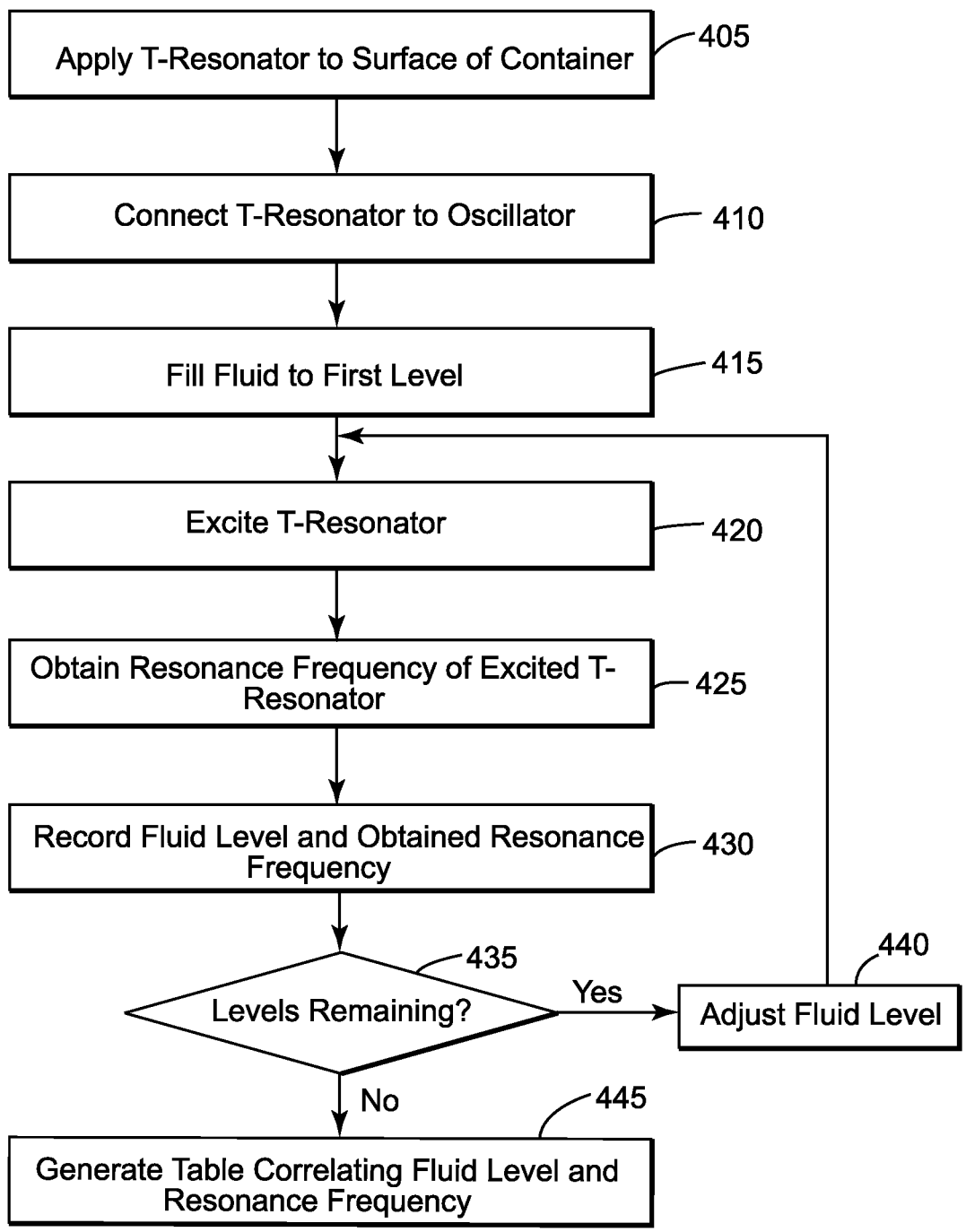
FIG. 4 illustrates a flowchart of a method for generating a correlation table between fluid levels and resonance frequencies of a T-resonator according to an embodiment.

Once the oscillator 104 is tuned to provide a desired phase response over a predetermined frequency range, a correlation table between fluid levels and resonance frequencies of a T-resonator is generated so that when the sensor system is deployed, the fluid level can be determined once the resonance frequency of the T-resonator is determined. This is illustrated by the flowchart of FIG. 4 in which the T-resonator 108 is applied to the surface of a container 214 (step 405) and connected to the oscillator 104 (step 410). If the T-resonator 108 is already applied to the surface of the container 214 and/or connected to the oscillator 104, then these steps can be omitted.

The container is then filled with fluid to a number of different levels and measurements of the resonance frequency of the T-resonator are made for each of the number of different levels. The number of levels used depends upon the granularity required for the sensor system, the greater granularity the more levels are employed. Specifically, the container 214 is filled with fluid to a first level (step 415), the T-resonator is excited (step 420), the resonance frequency of the excited T-resonator 108 is obtained (step 425) and recorded along with the fluid level (step 430). If there are remaining levels for the correlation table ("Yes" path out of decision step 435), then the fluid level is adjusted (step 440) and the T-resonator 108 is excited again and the resonance frequency is obtained and recorded (steps 420-430). Once the T-resonator 108 has been excited for all desired fluid levels ("No" path out of decision step 435), then a table is generated correlating fluid level with resonance frequency (step 445).

Figure 5:
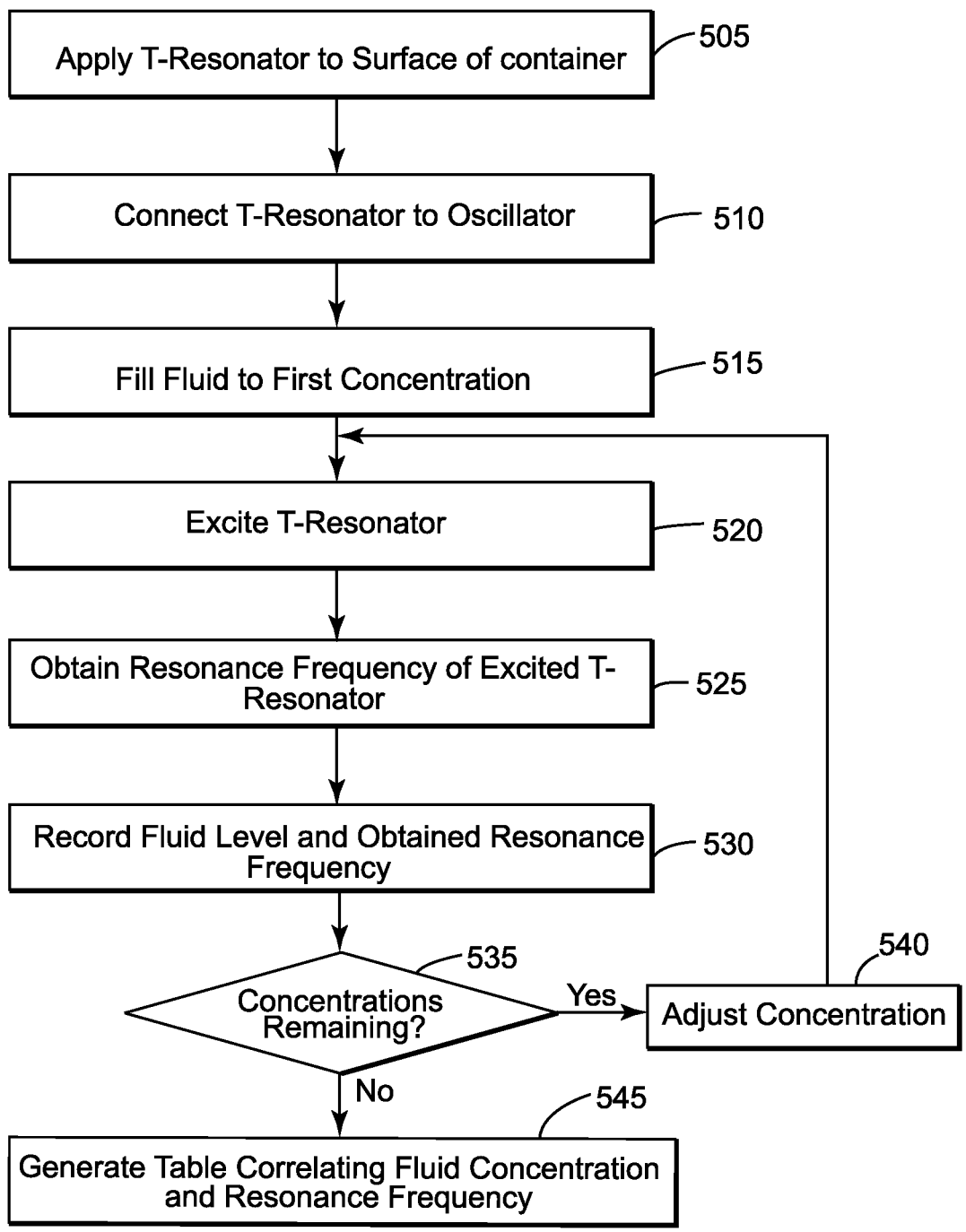
FIG. 5 illustrates a flowchart of a method for generating a correlation table between fluid concentration and resonance frequencies of a T-resonator according to an embodiment.

The sensor system disclosed herein can determine fluid concentrations using the resonance frequency of the T-resonator 108 in a similar manner to the determination of fluid levels, which is illustrated in the flowchart of FIG. 5. The differences between the methods of FIGS. 4 and 5 is that in FIG. 4 the fluid level is adjusted (step 440), whereas in FIG. 5 the fluid concentration is adjusted (step 540). Otherwise, the two methods are similar.

Figure 6:
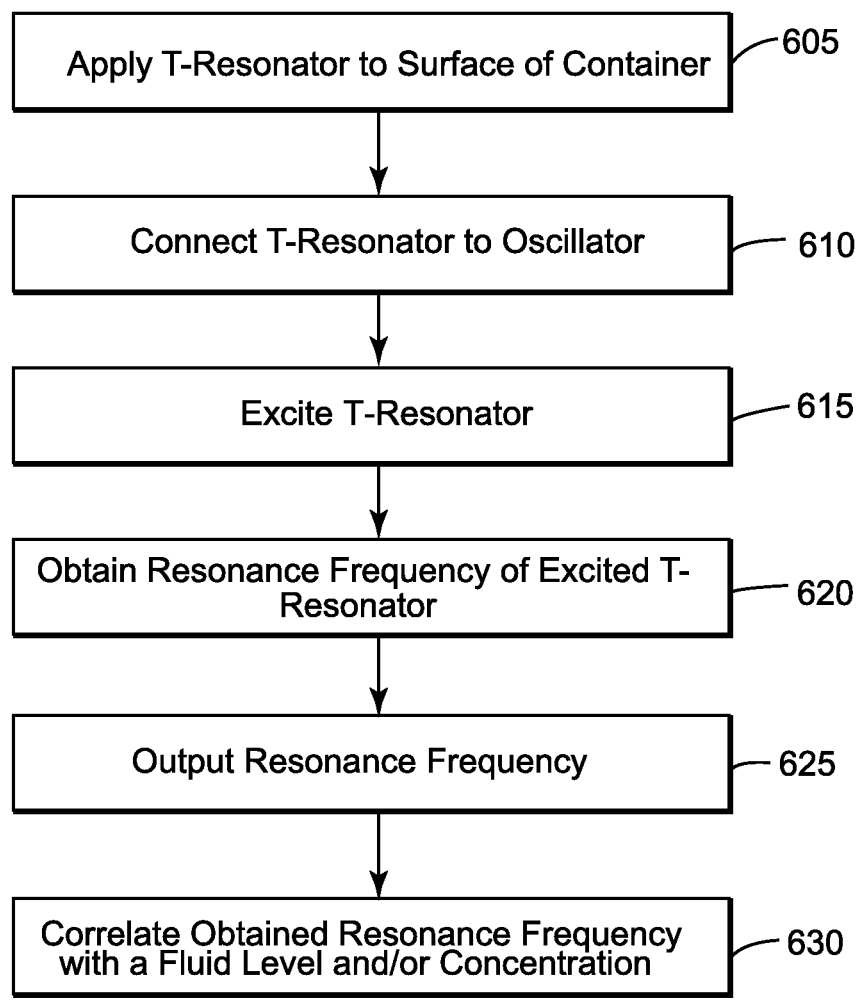
FIG. 6 illustrates a flowchart of a method for determining a fluid characteristics using a T-resonator sensor system according to an embodiment.

Having tuned the oscillator 104 for the desired frequency range and generated the correlation table, the sensor system 100 can be used to determine fluid levels by resonance frequency of the T-resonator 108, which is illustrated in the flowchart of FIG. 6. The T-resonator 108 is applied to the surface of a container 214 (step 605) and connected to the oscillator 104 (step 610). Again, these steps can be omitted if the T-resonator has already been applied to the container 214 and connected to the oscillator 104. The T-resonator 108 is excited (step 615) and the resonance frequency of the excited T-resonator 108 is obtained (step 620). The obtained resonance frequency is then output to port 126 of the oscillator (step 625) and the obtained resonance frequency is correlated with a fluid level and/or fluid concentration from the correlation table (step 630). The correlation can be performed by the aforementioned microcontroller and comparator or any other type of processor or system, including the one illustrated in FIG. 10, which will be described in more detail below. The component(s) performing the correlation can receive signals corresponding to the resonance frequency via a wired or wireless interface.

Figure 7:
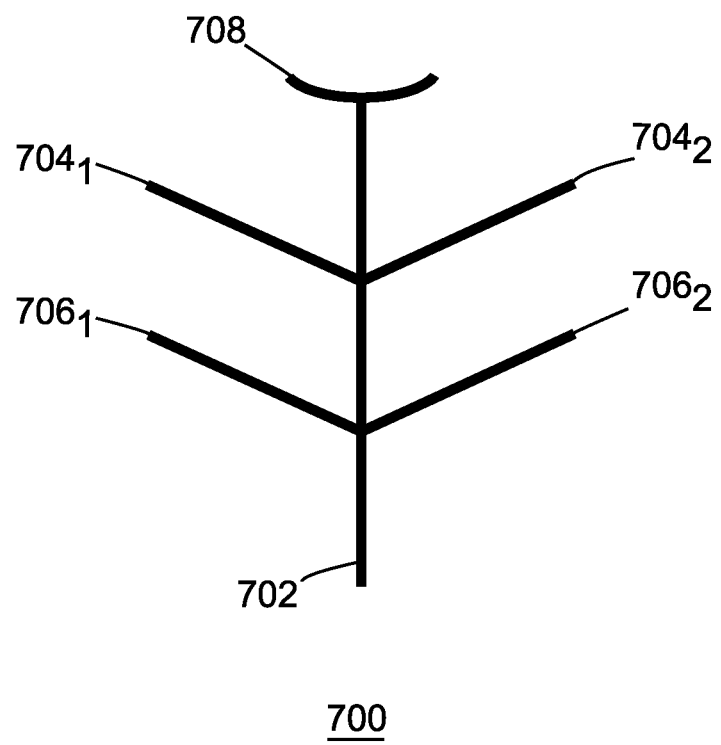
FIG. 7 is a schematic diagram of a branched T-resonator used as part of a fluid sensor system according to an embodiment.

The T-resonator design described above in connection with FIGS. 2A and 2B works well when the container 214 is relatively rigid and does not move. However, movement of the container 214, such as tilting, may provide a resonance frequency that does not correlate to the actual fluid level. One situation where the tilting may occur is when the container 214 is a flexible bag holding fluids, such as a medicine delivery bag or a blood bag. A branched T-resonator can be employed to address this tilting issue. FIG. 7 illustrates a branched T-resonator 700, which includes a stub 702, branches $704_1$, $704_2$, $706_1$, and $706_2$, and a feedline 708. The feedline 708 includes port for connection to the sensor in a similar manner to ports 208 and 210 of the T-resonator in FIGS. 2A and 2B. Thus, the remainder of the sensor system in FIG. 1 is the same with the branched T-resonator as it is for the T-resonator. Specifically, the ground plane 212 can also be used as part of the branched T-resonator.

The branches are arranged in pairs so that one pair includes symmetrical branches $704_1$ and $704_2$ and another pair includes symmetrical branches $706_1$ and $706_2$, each pair being non-perpendicularly coupled to the stub 702. In the non-limiting illustrated example, each pair of symmetrical branches are coupled at an angle of 45°. Although FIG. 7 illustrates two branch pairs, the branched T-resonator can include additional branch pairs. Compared to the T-resonator illustrated in FIGS. 2A and 2B, which resonates at a single frequency for a given dielectric medium, in the branched T-resonator 700 each branch produces a new resonance frequency.

The effect of the container tilt on the detected characteristic of the fluid in the container can be compensated for by applying, for example, an average to the multiple resonance frequencies from the different branches. Assume, for example, $f_1$ is the resonance frequency of the stub 702, $f_2$ is the resonance frequency of branch $704_1$, $f_3$ is the resonance frequency of branch $704_2$, $f_4$ is the resonance frequency of branch $706_1$, and $f_5$ is the resonance frequency of branch $706_2$. When the container is perpendicular to the ground $f_2=f_3$ and $f_4=f_5$. However, when the container is tilted the resonant frequency of one branch of a branch pair increases and the resonant frequency of the other branch of the branch pair decreases (e.g., $f_2$ increases and $f_3$ decreases; $f_4$ increases and $f_5$ decreases). Thus, by averaging the resonance frequencies, for example using a weighted average, a resonance value that is independent of the tilt of the container can be obtained.

Figure 8B:
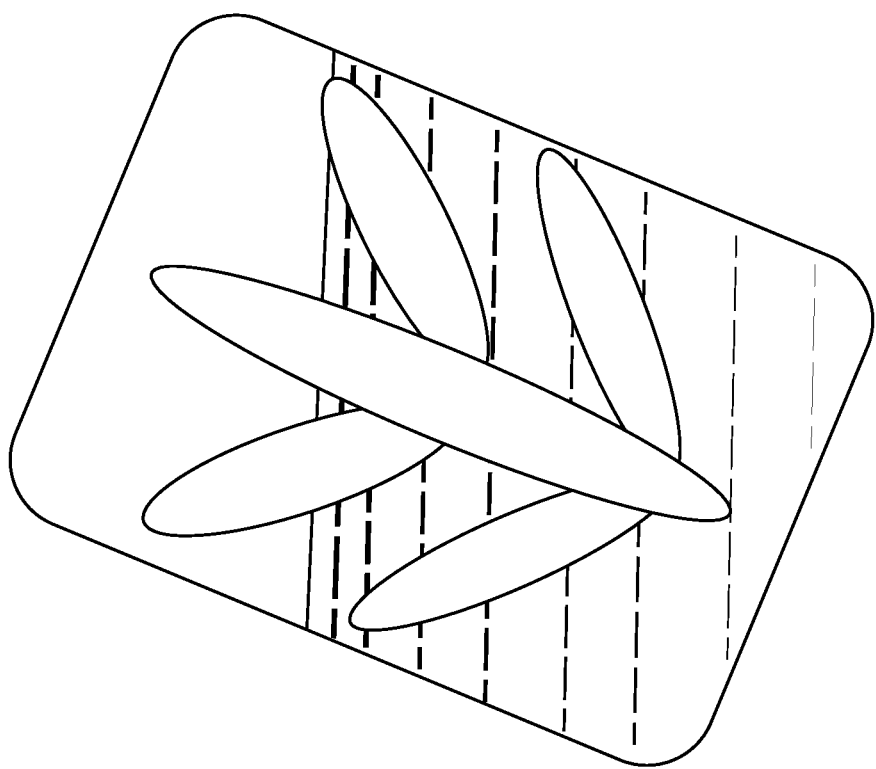
FIGS. 8A and 8B are schematic diagrams of a branched T-resonator attached to a tiltable container according to an embodiment.
Figure 8A:
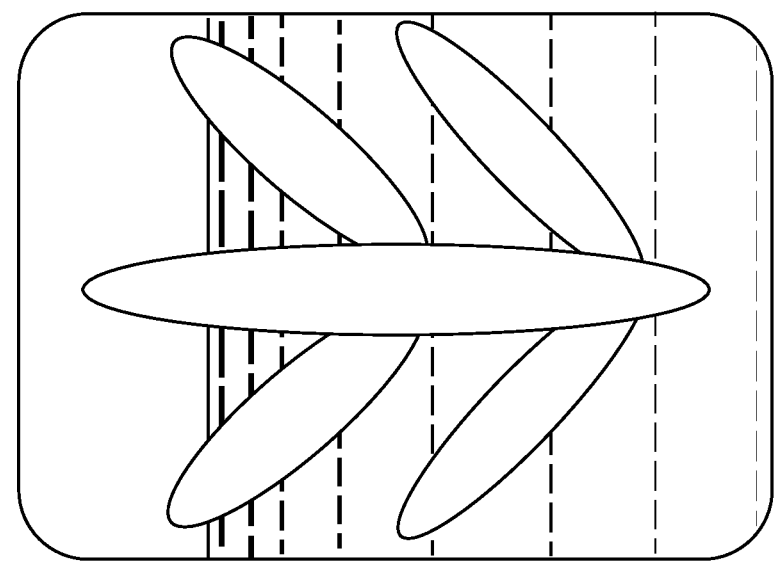

FIG. 8A illustrates a branched T-resonator in a container that is arranged upright so that fluid level is approximately level and FIG. 8B illustrates a branched T-resonator in a container having the same volume of fluid as in FIG. 8A but is tilted so that the fluid level is also approximately level to the ground but the branched T-resonator is tilted relative to the ground. With the container arranged as illustrated in FIG. 8A, the resonance frequencies from the two branches belonging to a branch pair will overlap, whereas with the container arranged as illustrated in FIG. 8B, the resonance frequencies from the branches of a branch pair will diverge. Applying an average, such as a weighted average, to the multiple resonance frequencies from the different branches produces an averaged resonance frequency that is independent of the tilt of the container.

FIG. 9 illustrates a flowchart of a method for determining a fluid level and/or fluid concentration using a branched T-resonator 700 according to an embodiment. The branched T-resonator 700 is applied to the surface of a container (step 905) and connected to the oscillator 104 (step 910). The branched T-resonator 700 is excited (step 915) and resonance frequencies of the branches of the branched T-resonator 700 are obtained (step 920). The obtained frequencies are output (step 925), subject to an average (step 930) and the average is correlated with a fluid level and/or concentration using a correlation table (step 935). The correlation can be performed by the aforementioned microcontroller and comparator or any other type of processor or system, including the one illustrated in FIG. 10, which will be described in more detail below. The component(s) performing the correlation can receive signals corresponding to the resonance frequency via a wired or wireless interface.

The above-discussed procedures and methods may be implemented in a computing device as illustrated in FIG. 10, which may be coupled to the sensor system output 126 via a wired or wireless connection. Hardware, firmware, software or a combination thereof may be used to perform the various steps and operations described herein.

The computing device 1000 of FIG. 10 is an exemplary computing structure that may be used in connection with such a system, and it may include a processor 1002 and a storage device 1004 that communicate via a bus 1006. An input/output interface 1008 also communicates with the bus 1006 and allows an operator to communicate with the processor or the memory, for example, to input software instructions for operating the sensing system. The computing device 1000 may be a controller, a computer, a server, etc. The storage device 1004 can store the correlation table and the computing device 1000 can obtain the resonance frequency or frequencies and correlate the obtained resonance frequency to a fluid level and/or concentration or average the obtained resonance frequencies and correlated the average with a fluid level and/or concentration.

The disclosed fluid sensor system can be used in a number of different applications, including the medical industry to automate drug delivery from drug delivery bags, the chemical industry to detect and control the filling level of containers containing different chemicals, and the water industry to detect the salinity/purity of agricultural water.

The disclosed embodiments provide fluid sensor, fluid sensor system, and methods of making and using the fluid sensor and fluid sensor system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A sensor system for determining a characteristic of a fluid in a container, the sensor system comprising:
   a planar T-resonator, which includes (1) a conductor having (i) a feedline coupled to (2) a stub, and (2) a ground plane, wherein the feedline has first and second ends and the stub is attached to the feedline between the first and second ends so that the planar T-resonator is shaped as letter T; and
   an oscillator having an input coupled to the first end of the feedline of the planar T-resonator and an output, wherein the oscillator has a negative resistance within a predetermined frequency range and an input phase of the oscillator is approximately equal to a phase of the planar T-resonator over a majority of the predetermined frequency range,
   wherein the second end of the feedline is coupled to an electrical load.

2. The sensor system of claim 1, wherein the planar T-resonator includes at least a first pair of symmetrical branches and a second pair of symmetrical branches coupled to the stub.

3. The sensor system of claim 1, wherein the output of the oscillator is coupled to a wireless communication interface and provides a signal corresponding to a resonant frequency of the planar T-resonator.

4. The sensor system of claim 1, wherein the planar T-resonator is printed on a flexible substrate and the oscillator is on a non-flexible substrate.

5. The sensor system of claim 1, wherein the planar T-resonator is printed on a surface of the container.

6. The sensor system of claim 5, wherein the container is a flexible container.

7. The sensor system of claim 1, wherein the oscillator includes a transistor, a first capacitor coupled to a gate of the transistor, and a second capacitor coupled to a drain of the transistor, wherein parameters of the first and second capacitors are selected so that the input phase of the oscillator is approximately equal the phase of the planar T-resonator over the majority of the predetermined frequency range.

8. The sensor system of claim 7, wherein the transistor is a high electron mobility transistor (HEMT).

9. A sensor system for determining a characteristic of a fluid in a container, the sensor system comprising:
   a planar, branched T-resonator, which includes a conductor having a feedline coupled to a stub, at least two symmetrical branches coupled to the stub, and a ground plane, wherein the feedline has first and second ends and the stub is attached to the feedline between the first and second ends so that the planar, branched T-resonator is shaped as letter T; and
   an oscillator having an input coupled to the first end of the feedline of the planar, branched T-resonator and an output, wherein the oscillator has a negative resistance within a predetermined frequency range,
   wherein the second end of the feedline is coupled to an electrical load.

10. The sensor system of claim 9, wherein the at least two symmetrical branches are non-perpendicularly coupled to the stub.

11. The sensor system of claim 9, wherein an input phase of the oscillator is approximately equal to a phase of the planar, branched T-resonator over a majority of the predetermined frequency range.

12. The sensor system of claim 11, wherein the oscillator includes a transistor, a first capacitor coupled to a gate of the transistor, and a second capacitor coupled to a drain of the transistor, wherein parameters of the first and second capacitors are selected so that the input phase of the oscillator is approximately equal the phase of the planar, branched T-resonator over the majority of the predetermined frequency range.

13. A method for determining a characteristic of a fluid in a container, the method comprising:
   exciting a planar, branched T-resonator that includes a feedline coupled to a stub, at least two symmetrical branches coupled to the stub, and a ground plane, wherein the feedline has first and second ends, the stub is connected to the feedline between the first and second ends so that the planar, branched T-resonator is shaped as letter T, the first end of the planar, branched T-resonator is connected to an oscillator having a negative resistance within a predetermined frequency range, and the second end of the feedline is connected to an electrical load, wherein the planar, branched T-resonator is applied to a surface of the container;
   obtaining a resonance frequency of the excited planar, branched T-resonator; and
   determining the characteristic of the fluid based on the obtained resonance frequency.

14. The method of claim 13, wherein the planar, branched T-resonator includes at least four branches coupled to the stub, and the resonance frequency is obtained by an average of resonance frequencies of each of the at least four branches.

15. The method of claim 13, wherein the characteristic of the fluid is a level of the fluid in the container or a concentration of the fluid in the container.

16. The method of claim 13, further comprising:
   tuning the oscillator by adjusting capacitive and/or resistive parameters of electric components of the oscillator so that an input phase of the oscillator is approximately equal to a phase of the planar, branched T-resonator over a majority of the predetermined frequency range.

17. The method of claim 13, further comprising:
generating a table correlating values of the characteristic of the fluid with resonance frequencies of the T-resonator.

18. The method of claim 17, wherein determining the characteristic of the fluid comprises correlating, using the table, the obtained resonance frequency with a value of the characteristic of the fluid.

19. The method of claim 13, further comprising:
printing the planar, branched T-resonator on the surface of the container.

20. The method of claim 13, further comprising:
printing the planar, branched T-resonator on flexible substrate, which is applied to the surface of the container.

* * * * *